United States Patent
Evans et al.

(10) Patent No.: US 7,477,904 B2
(45) Date of Patent: Jan. 13, 2009

(54) SYSTEM FOR LOCATING A MOBILE UNIT

(75) Inventors: David H. Evans, Crawley (GB); Paul J. Rankin, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 109 days.

(21) Appl. No.: 10/522,701

(22) PCT Filed: Jul. 16, 2003

(86) PCT No.: PCT/IB03/03222

§ 371 (c)(1),
(2), (4) Date: Jan. 28, 2005

(87) PCT Pub. No.: WO2004/014096

PCT Pub. Date: Feb. 12, 2004

(65) Prior Publication Data

US 2005/0277426 A1 Dec. 15, 2005

(30) Foreign Application Priority Data

Jul. 31, 2002 (GB) .................................. 0217707.9

(51) Int. Cl.
*H04Q 7/20* (2006.01)
(52) U.S. Cl. .............. 455/456.1; 455/452.2; 455/456.2; 455/456.3
(58) Field of Classification Search .............. 455/422.1, 455/456.1, 456.2, 456.3, 452.1, 452.2, 453, 455/456.6; 340/5.61, 991, 426.22
See application file for complete search history.

(56) References Cited

U.S. PATENT DOCUMENTS

| 5,687,171 | A | * | 11/1997 | Shin et al. .................. 370/335 |
| 5,850,609 | A | | 12/1998 | Sugarbroad et al. |
| 5,862,476 | A | * | 1/1999 | Hasegawa ................ 455/432.2 |
| 2002/0085719 | A1 | * | 7/2002 | Crosbie ....................... 380/248 |
| 2002/0180640 | A1 | * | 12/2002 | Gilkes et al. ................ 342/387 |
| 2002/0180641 | A1 | * | 12/2002 | Fink et al. ................... 342/464 |
| 2003/0045317 | A1 | * | 3/2003 | Pan et al. .................... 455/518 |
| 2004/0207510 | A1 | * | 10/2004 | Buchner .................... 340/5.61 |

FOREIGN PATENT DOCUMENTS

| EP | 1032991 B1 | 3/2002 |
| JP | 11341549 | 12/1999 |
| WO | 0050919 A2 | 8/2000 |

OTHER PUBLICATIONS

By Martin Ma et al. Entitled: "Application Bluetooth Wireless Technology to Guided Audio Tours" Advisor: David G. Michelson, University of British Columbia, Vancouver, BC, Canada, May 4, 2001, pp. 1-27.

By Michael Spratt, Entitled: "An Overview of Positioning by Diffusion" Mobile Systems and Services Laboratory HP Laboratories Bristol; HPL-2001-207; Sep. 9, 2001. pp. 1-21.

* cited by examiner

*Primary Examiner*—Duc Nguyen
*Assistant Examiner*—Dai A Phuong
(74) *Attorney, Agent, or Firm*—Michael E. Belk

(57) ABSTRACT

A wireless local area network (LAN) comprises an access point which transmits a beacon signal at 0 dBm. The detection threshold of the mobile unit is −65 dBm and thus the mobile unit is detected when located within 10 meters of the access point.

18 Claims, 5 Drawing Sheets

SYSTEM FOR LOCATING A MOBILE UNIT

The present invention relates to a system for locating a mobile unit, particularly, although not exclusively which includes a wireless local area network (LAN).

It is desirable to locate a mobile unit, such as a cellular telephone handset or personal data assistant (PDA), so as to provide customised services, such as targeting advertisements at potential customers passing a shop.

It is known to locate a mobile unit using the global positioning system (GPS). However, GPS, particularly for mass-market use, suffers several drawbacks. Firstly, it is costly to manufacture a mobile unit including a GPS receiver. Secondly, there is delay in locating the mobile unit when it is first switched on. Thirdly, it is difficult to locate a mobile unit when it is positioned indoors.

It is also known to locate a mobile unit using wireless local area networks (LANs). For example, it is possible to locate a mobile unit relative to fixed units using so-called "time of arrival" (TOA) method in which a time delay is used to calculate the distance between a fixed and a mobile unit. However, the TOA method yields coarse results which are accurate to no more than about 100 metres. A more accurate method uses "time difference of arrival" (TDOA) in which a mobile unit receives signals at different times. However, the TDOA method requires multiple fixed units. Another method employs high chipping rates used to spread a signal across a wider bandwidth. The higher chipping rates use shorter pulse lengths, which provides improved resolution.

A mobile unit may be more accurately located by exchanging information with fixed units and other mobile units, as described in "An Overview of Positioning by Diffusion" by Michael Spratt, Hewlett-Packard Laboratories, Bristol, UK, 9 Sep. 2001.

The present invention seeks to provide a system for locating a mobile unit. According to the present invention there is provided a system for locating a mobile unit including means for transmitting a first signal at a relatively high power, means for transmitting a second signal at a predetermined, relatively low power, means for receiving said first signal, means for determining a first signal strength of said first signal at said means for receiving said first signal, means for determining whether said first signal strength exceeds a relatively low threshold level so as to determine whether service may be provided, means for receiving said second signal, means for determining a second signal strength of said second received at received at said means for receiving said second signal, means for determining whether said second signal strength exceeds a relatively high threshold level so as to locate the mobile unit within a known distance of said means for transmitting said second signal.

The relatively high power may be at least 0 dBm, 6 dBm, 13 dBm or 20 dBm. The relatively low power may be no more than 0 dBm. The relatively low threshold level may be no more than −85 dBm. The relatively high threshold level may be no less than −65 dBm. The means for transmitting said first and second signals may transmit the first and second signals at different times.

The system may be a wireless local area network. The means for transmitting the first signal may be an access point and the means for transmitting the second signal may also be an access point. The means for receiving the first signal may be a mobile unit and the means for receiving the first signal may also be a mobile unit.

The means for transmitting the first signal may be a mobile unit and the means for transmitting the second signal may also be a mobile unit. The means for receiving the first signal may be an access point and the means for receiving the second signal may also be an access point.

According to the present invention there is also provided a system for locating a mobile unit including a first transmitter for transmitting a first signal at a relatively high power, a second transmitter for transmitting a second signal at a predetermined, relatively low power, a first receiver for receiving said first signal, a first detector for determining a first signal strength of said first signal at said first receiver, a first controller for determining whether said first signal strength exceeds a relatively low threshold level so as to determine whether service may be provided, a second receiver for receiving said second signal, a second detector for determining a second signal strength of said second signal at said second receiver, a second controller for determining whether said second signal strength exceeds a relatively high threshold level so as to locate the mobile unit within a known distance of said means for transmitting said second signal.

According to the present invention there is also provided a method of operating the system.

Embodiments of the present invention will now be described, by way of example with reference to the accompanying drawings, in which.

Figure 1:
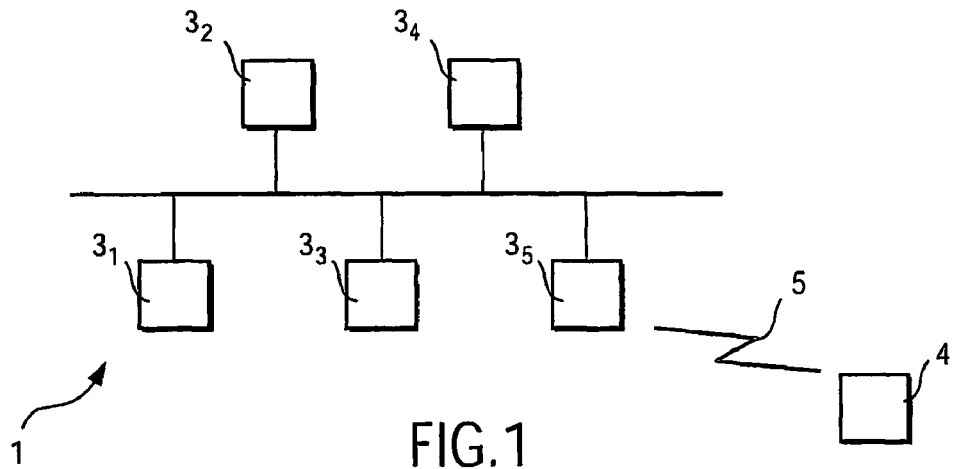
FIG. 1 is a schematic diagram of a wireless local area network.

Referring to FIG. 1, a system for locating a mobile unit according to the present invention is shown. The system comprises a wireless local access network (LAN) 1 including a wired network 2 and a plurality of access points $3_1, 3_2, 3_3, 3_4, 3_5$. A mobile unit 4 is connectable to the wireless LAN 1 via a wireless link 5. In this example, the wireless network 1 and mobile unit 4 are connectable using radio frequency signals operating in the 2.4 GHz band according to the IEEE 802.11 standard.

Figure 2:
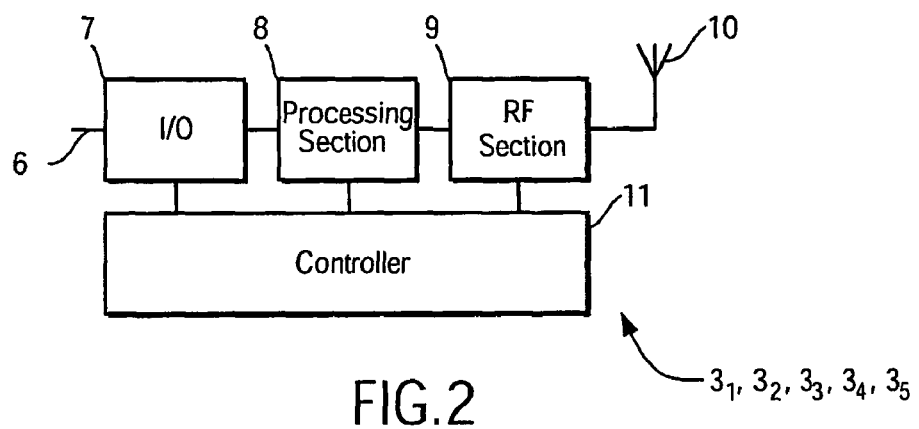
FIG. 2 is a schematic diagram of a access point

Referring to FIG. 2, each access point $3_1, 3_2, 3_3, 3_4, 3_5$ comprises a connector 6 to the wired network 2, an input/output section 7, a data processing section 8, a radio frequency section 9, an antenna 10 and a controller section 11. The input/output section 7 transmits and receives data to and from the wired network 2 and, amongst other things, buffers data. The processing section 8 for instance applies error protection/error detection routines and encrypts/decrypts data. The radio frequency section 9 for example modulates and demodulates signals and amplifies them. The input/output section 7, the data processing section 8, the radio frequency section 9 are controlled by the controller section 11.

Figure 3:
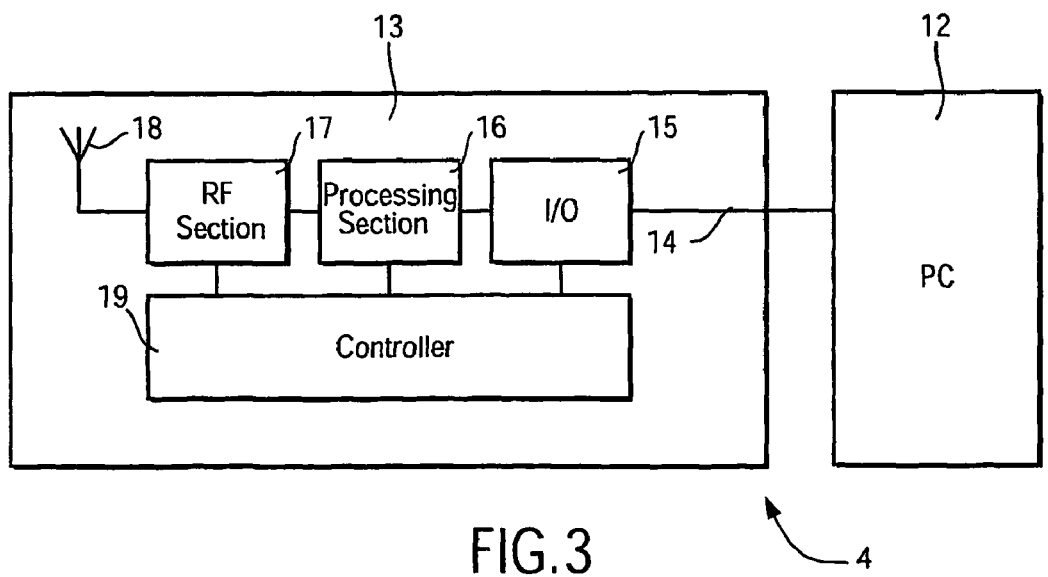
FIG. 3 is a schematic diagram of a mobile unit.

Referring to FIG. 3, the mobile unit 4 comprises a personal computer 12, such as a lap-top computer, and a wireless transmitter/receiver 13, for example in the form of a wireless network card. The wireless transmitter/receiver 13 comprises a connector 14 to the personal computer 12, an input/output section 15, a data processing section 16, a radio frequency section 17, an antenna 18 and a controller section 19, and have substantially the same functions as the corresponding sections of the wireless access point.

Further details regarding the wireless LAN 1 and the wireless transmitter/receiver 13 are described in Chapter 5 of "Deploying Wireless LANs" by Gil Held (McGraw-Hill, 2002).

Figure 4:
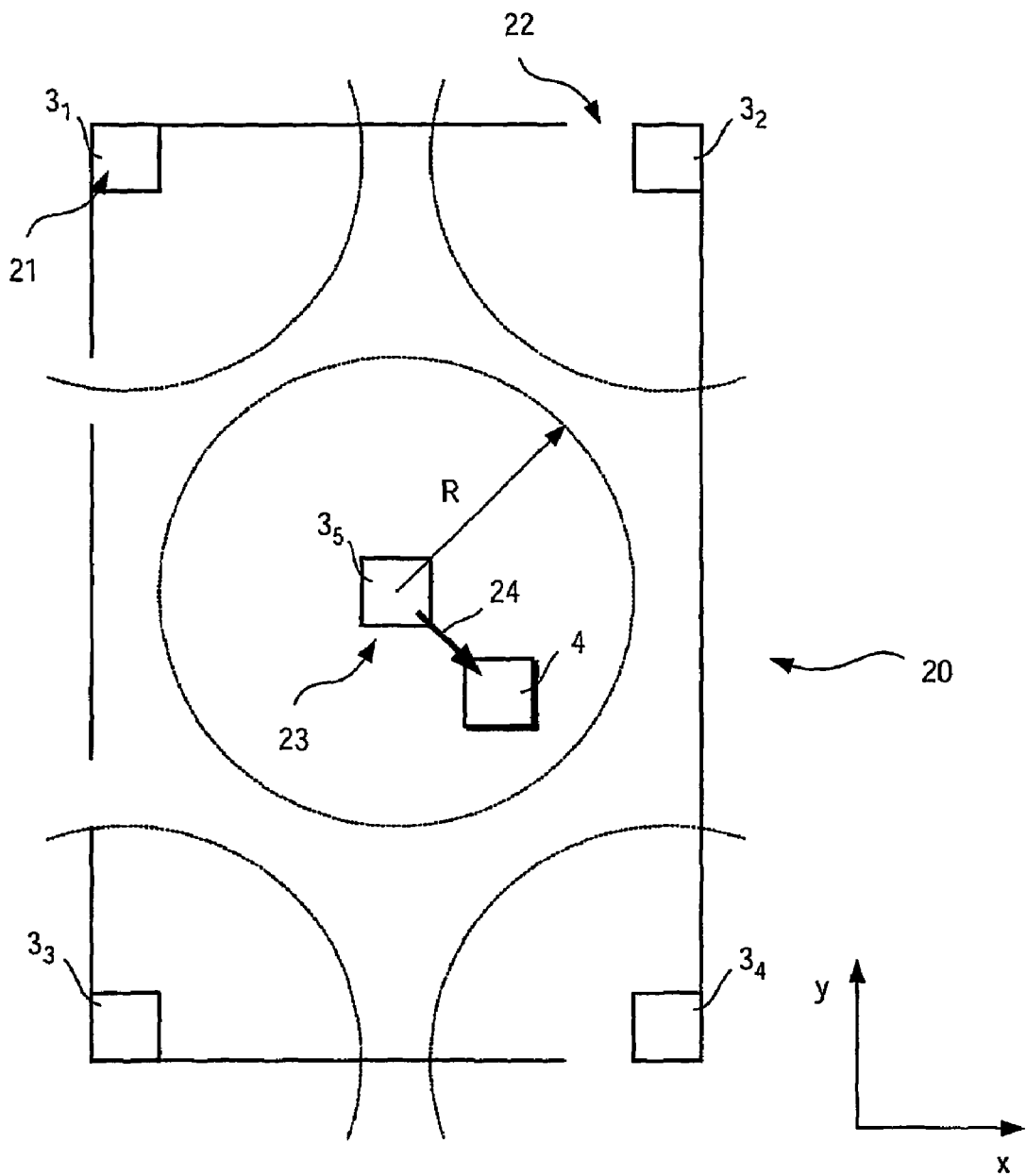
FIG. 4 shows the wireless local area network of FIG. 1 deployed in a room.

Referring to FIG. 4, the access points $3_1, 3_2, 3_3, 3_4, 3_5$ are deployed in a room 20. In this example, the access points $3_1, 3_2, 3_3, 3_4, 3_5$ are positioned in corners 21 of the room 20, some of which are located by doorways 22, and in the centre 23. The positions of the access points $3_1, 3_2, 3_3, 3_4, 3_5$ are known and may be labelled $(x_1, y_1), (x_2, Y_2), (x_3, y_3), (x_4, y_4)$ and $(x_5, y_5)$ respectively.

The mobile unit 4 may be located using an access point $3_1, 3_2, 3_3, 3_4, 3_5$, as will now be explained:

Each access point $3_1, 3_2, 3_3, 3_4, 3_5$ is a transmitter and receiver. An access point $3_1, 3_2, 3_3, 3_4, 3_5$ can transmit a signal at a selectable transmission power level, $P_{tx}$. In this example, there are four selectable power levels, namely 20 dBm (100 mW), 13 dBm (20 mW), 6 dBm (4 mW) and 0 dBm (1 mW). Other power levels may be used. For example, the highest power level may be 30 dBm (1000 mW).

The mobile unit 4 is also a transmitter and receiver. The mobile unit 4 can measure the power of a signal received by the antenna 18 and define a received signal strength indication (RSSI). This may be implemented in the rf section 17 (FIG. 3). In this example, there are 16 RSSI levels ranging from level 0, which corresponds to a minimum detection level, in this case −85 dBm, to level 15 which corresponds to a maximum allowable input level, in this example −10 dBm, in 5 dBm intervals.

The mobile unit 4 sets a detection threshold, $P_{det}$. In this example, setting the detection threshold comprises measuring the signal strength and determining whether the received signal strength equals or exceeds the detection threshold. In an alternative embodiment, setting the detection threshold may comprises selecting a gain of the receiver 4, which limits the level of signal which can be detected, and determining whether a signal is detected.

Figure 5:
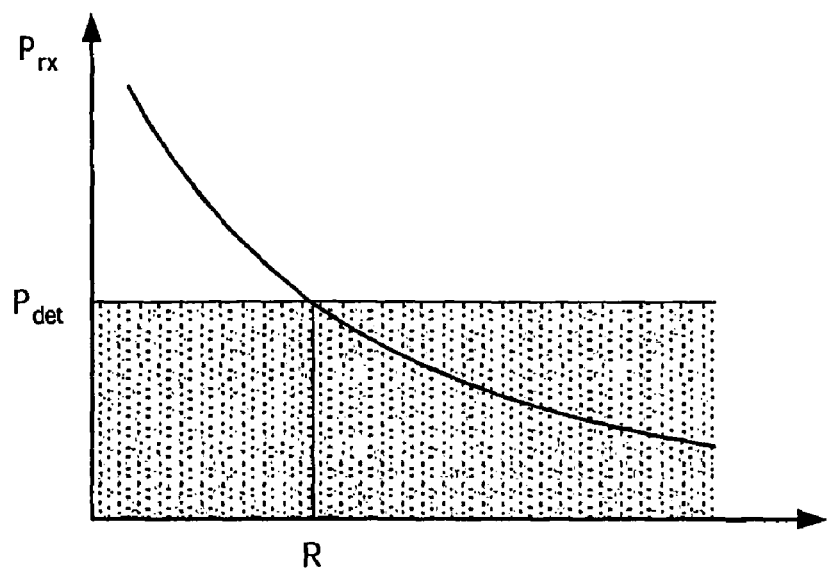
FIG. 5 shows a relationship between power of a signal received at a mobile unit and distance between the mobile unit and a transmitter.

Referring also to FIG. 5, a signal 24 transmitted by the access point $3_5$ and received at the mobile unit 4 is attenuated. The received signal strength, $P_{rx}$, is inversely proportional to the square of the distance, r, separating the access point $3_5$ and the mobile unit 4, i.e. $P_{rx} \propto 1/r^2$. If the mobile unit 4 detects the signal 24, then the mobile unit 4 is located within a radius R of the access point $3_5$.

A low transmission power level $P_{tx}$, for example 0 dBm, and a high detection threshold $P_{det}$, preferably −65 dBm, are selected so as locate the mobile unit 4 accurately, in this case within a radius of 10 metres of the wireless access point $3_5$. However, a higher transmission power level $P_{tx}$ and a lower detection threshold $P_{det}$ are used, for example for providing service.

The mobile unit 4 may be located using an access point $3_1, 3_2, 3_3, 3_4, 3_5$ under different situations:

Location Prior to Connection to Wireless LAN 1

A mobile unit 4 may access a cell served by an access point $3_1, 3_2, 3_3, 3_4, 3_5$, usually referred to as a basic service set (BSS), by listening for a beacon frame transmitted by an access point $3_1, 3_2, 3_3, 3_4, 3_5$. This process is known as passive scanning. Beacon frames are defined in a medium access control (MAC) sub-layer of the IEEE 802.11 standard.

A modified passive scanning process is used to locate the mobile unit 4.

Figure 6:
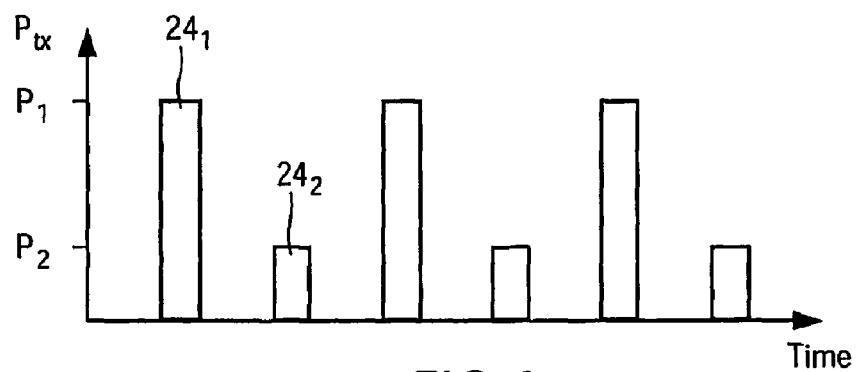
FIG. 6 is a plot of transmitted power against time.

Referring to FIG. 6, the access point $3_5$ transmits first and second beacon signals $24_1, 24_2$. The beacon signals $24_1, 24_2$ are repeatedly transmitted, for example every 20 milliseconds to 1 seconds, preferably every 1 s. The first signal $24_1$ is transmitted at a high transmission power $P_1$, for example 20 dBm (100 mW), and the second signal $24_2$ is transmitted at a low transmission power $P_2$, in this case 0 dBm (1 mW).

Figure 7:
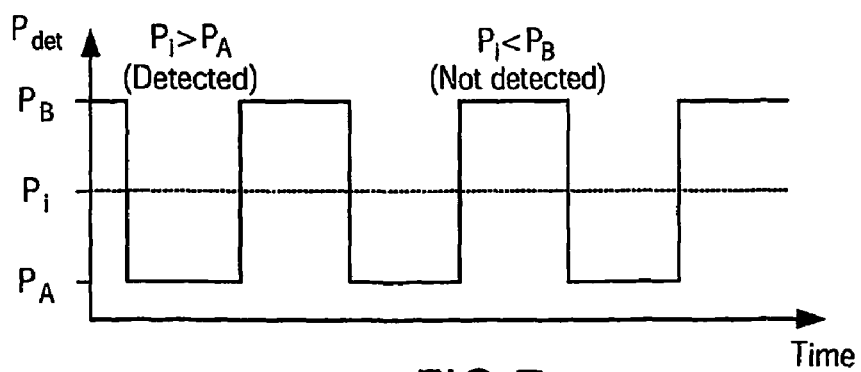
FIG. 7 is a plot of detection threshold against time.

Referring to FIG. 7, the mobile unit 4 listens for signals in passive scanning mode, measuring received signal strengths and determining whether they exceed first and second signal detection thresholds $P_A, P_B$ respectively. The first signal detection threshold $P_A$ is low, for example −85 dBm, and the second signal detection threshold $P_B$ is high, for example −65 dBm. Thus, if a received signal has a power $P_i$ lying between $P_A$ and $P_B$ ($P_A < P_i < P_B$), then it exceeds $P_A$ and is detected. However, $P_i$ falls below $P_B$ and is not detected.

Therefore, the detectable range $R_1$ for the first signal $24_1$ transmitted at $P_1$ and detected with the first threshold $P_A$ is usually about 100 metres assuming a clear line of sight between the mobile unit 4 and the access point $3_5$. The detectable range $R_2$ for the second signal $24_2$ transmitted at $P_2$ and detected with the second threshold $P_B$ is about 10 metres.

Thus, if the mobile unit 4 detects the second signal $24_2$, then it is within 10 metres of the access point $3_5$. The position of the access point $3_5$ is preferably included in the beacon frame to permit the mobile unit 4 to locate itself. Additionally or alternatively, the mobile unit 4 may return a signal to the access point $3_5$ identifying itself and the fact that it has detected the second signal $24_2$. This allows the access point $3_5$ or the wireless LAN 1 to locate the mobile Location After Connection to Wireless LAN 1

Once the mobile unit 4 has joined a cell, it may stay there or roam to another cell without losing a connection. In either case, the mobile unit 4 is connected to an access point $3_1, 3_2, 3_3, 3_4, 3_5$ and may exchange management, control and data frames. However, the mobile unit 4 may monitor a low power signal using the high threshold thereby allowing the location of the mobile unit 4 to be determined.

Figure 8:
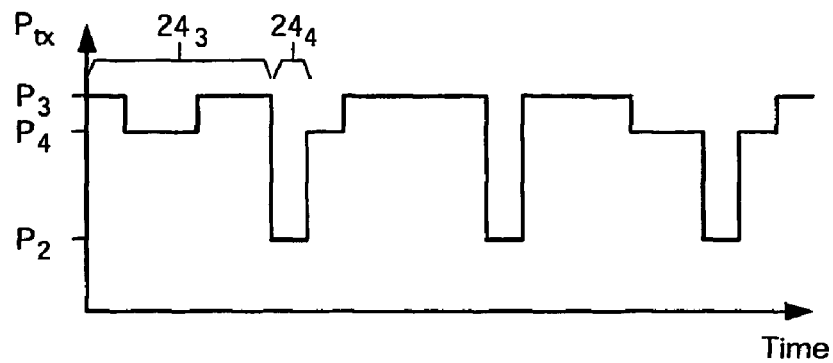
FIG. 8 is another plot of transmitted power against time.

Referring to FIG. 8, the access point $3_5$ transmits a third signal $24_3$ comprising management, control or data frames at one or more high power levels $P_3, P_4$. The power levels $P_3, P_4$ may be adapted as power varies due to change in position of the mobile unit 4. Periodically, the access point $3_5$ transmits a fourth signal $24_4$ at the low power level $P_2$.

The mobile unit 4 determines RSSI with first and second thresholds $P_A, P_B$ as described earlier. The detectable range $R_3$ for the third signal $24_3$ transmitted at $P_3, P_4$ and measured with the first threshold $P_A$ is about 10 to 100 metres and the detectable range $R_4$ for the fourth signal $24_4$ transmitted at $P_2$ and measured with the second threshold $P_B$ is about 10 metres.

Therefore, the mobile unit 4 may be provided with service by the access point $3_5$ in a relatively large area, for example within a radius of between 10 and 100 metres, and should it pass near to the access point $3_5$, it can be located within a smaller area, for instance within a radius of 10 metres.

Variable Detection Thresholds

The mobile unit 4 described earlier selects a single threshold $P_B$ for accurate location. However, the mobile unit 4 may be modified to vary a locating threshold $P_{loc}$, for example from a low value $P_A$ to a value $P_B$ so as determine for example, whether it is 30 metres or 10 metres away from the access point $3_5$.

Figure 9:
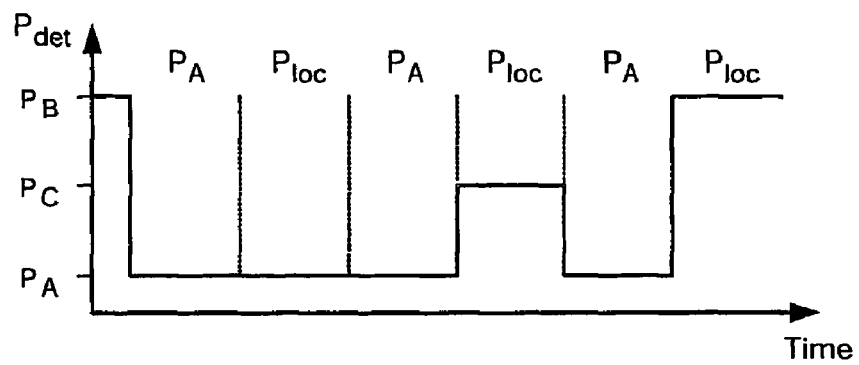
FIG. 9 is another plot of transmitter power against time.

Referring to FIG. 9, the threshold $P_{det}$ alternates between a value $P_A$ used for normal operation to the locating threshold $P_{loc}$, the locating threshold being stepped from $P_A, P_C$ to $P_B$, wherein $P_A < P_C < P_B$.

Figure 10:
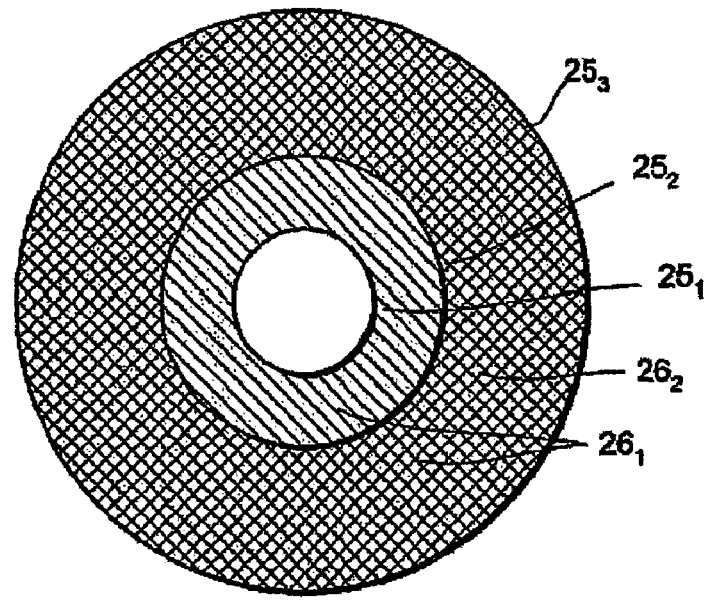
FIG. 10 shows regions in which a mobile unit may be located.

Referring to FIG. 10, this approach allows the mobile unit 4 to be located to varying degrees of accuracy, as indicated by circles $25_1, 25_2, 25_3$ of increasing radius.

Furthermore, it allows the mobile unit 4 to be located within annuli $26_1$, $26_2$ if the mobile unit 4 is not located within an inner circle $25_1$, $25_2$ but is located in an outer circle $25_2$, $25_3$.

Further details regarding the IEEE 802.11 standard are described in Chapter 6 of "Deploying Wireless LANs" ibid.

Different Transmitters, Different Transmission Power

In the embodiments hereinbefore described, the wireless LAN 1 is configured such that each access point $3_1$, $3_2$, $3_3$, $3_4$, $3_5$ multiplexes transmission power between a relatively high power for delivering service and relatively low power for locating the mobile unit 4.

Figure 11:
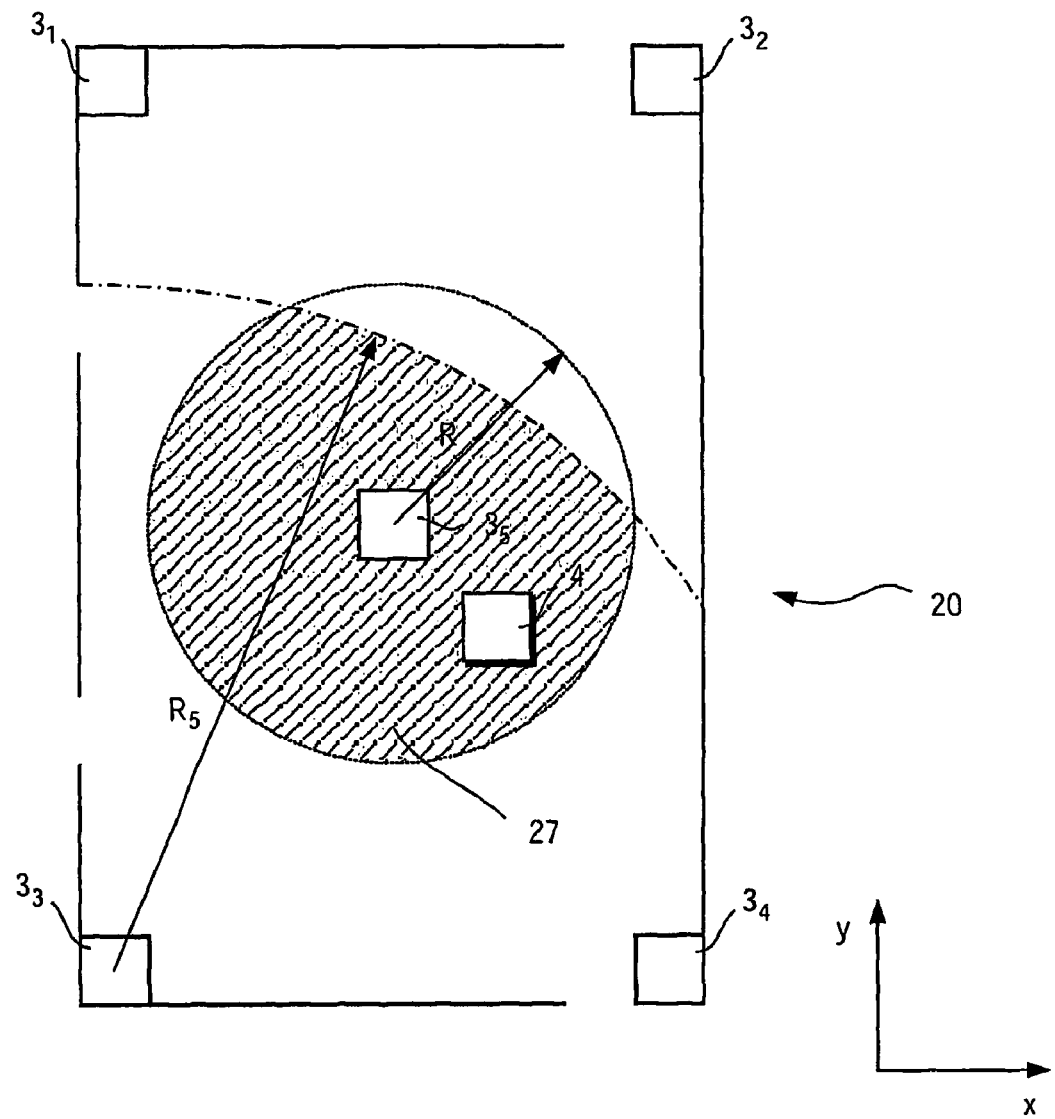
FIG. 11 shows the wireless local area network

Referring to FIG. 11, the wireless LAN 1 may be alternatively configured such that it comprises a first set of access points, for example access points $3_1$, $3_2$, $3_3$, $3_4$, which transmit at relative high transmission power, such as 20 dBm (100 mW), and a second set of access points, for example access point $3_5$, which transmit at relatively low transmission power, for instance 0 dBm (1 mW). The relatively high transmission power may be a range of relatively high transmission powers, preferably greater than 0 dBm (1 mW).

The wireless LAN 1 is arranged such that each of the access points in the second set lies within coverage of at least one access point of the first set. For clarity, regions of coverage provided by third and fifth access points $3_3$, $3_5$ are shown. Thus, in the alternative configuration, the first set of access points can deliver service to the mobile unit 4, while the second set of access points may be used for location. For example, the mobile unit 4 may be connected to, and provided with service by, the third access point $3_3$, while passively scanning for third access point $3_5$. If the mobile unit 4 receives a signal from the third access point $3_5$, it may use the signal for location in the manner described earlier.

The alternative arrangement has several advantages. It is simple to implement, thus reducing cost and complexity. It reduces latency and increases quality of service.

In the embodiments described earlier, location is performed using the access points $3_1$, $3_2$, $3_3$, $3_4$, $3_5$ as transmitters and the mobile unit 4 as a receiver. However, the earlier embodiments may be modified such that the role of the access points $3_1$, $3_2$, $3_3$, $3_4$, $3_5$ as transmitter and the role of the mobile unit 4 as receiver are reversed. In other words, the mobile unit 4 may be configured to transmit a signal at a low transmission power, for example 0 dBm (1 mW), while the access points $3_1$, $3_2$, $3_3$, $3_4$, $3_5$ are configured to set a high signal power detection threshold. Thus, if an access point $3_1$, $3_2$, $3_3$, $3_4$, $3_5$ detects the signal transmitted at the low power by the mobile unit 4, the access point is able to locate the mobile unit 4 accurately. Optionally, it may share location information with the mobile unit 4.

In another modification, the access point $3_1$, $3_2$, $3_3$, $3_4$, $3_5$ may be used as transmitters transmitting at a high transmission power for delivering service, while the mobile unit 4 may be used as a transmitter transmitting at low transmission power for location.

From reading the present disclosure, other variations and modifications will be apparent to persons skilled in the art. Such variations and modifications may involve equivalent and other features which are already known in the design, manufacture and use of systems for locating mobile units and component parts thereof and which may be used instead of or in addition to features already described herein. For example, an ad-hoc local area network or a plurality of devices conforming to Bluetooth™ specifications may be used instead of the wireless LAN 1 and mobile unit 4. The mobile unit 4 may be a personal data assistant (PDA) or a cellular telephone handset.

Although Claims have been formulated in this Application to particular combinations of features, it should be understood that the scope of the disclosure of the present invention also includes any novel features or any novel combination of features disclosed herein either explicitly or implicitly or any generalisation thereof, whether or not it relates to the same invention as presently claimed in any Claim and whether or not it mitigates any or all of the same technical problems as does the present invention. The Applicants hereby give notice that new Claims may be formulated to such features and/or combinations of such features during the prosecution of the present Application or of any further Application derived therefrom.

The invention claimed is:

1. A system for locating a mobile unit including:
   means for transmitting a first signal at a relatively high power, from an access point;
   means for transmitting a second signal at a predetermined, relatively low power, from said access point;
   means for receiving said first signal, at a mobile device;
   means for determining a first signal strength of said first signal at said means for receiving said first signal;
   means for determining whether said first signal strength exceeds a relatively low threshold level so as to determine whether service may be provided;
   means for receiving said second signal, at said mobile device;
   means for determining a second signal strength of said second signal received at said means for receiving said second signal;
   means for determining whether said second signal strength exceeds a relatively high threshold level so as to locate the mobile unit within a known distance of said means for transmitting said second signal.

2. A system according to claim 1, wherein said relatively high power is at least 0 dBm.

3. A system according to claim 1, wherein said relatively high power is at least 6 dBm, 13 dBm or 20 dBm.

4. A system according to claim 1, said relatively low power is no more than 0 dBm.

5. A system according to claim 1, wherein said relatively low threshold level is no more than −85 dBm.

6. A system according to claim 1, wherein said relatively high threshold level is no less than −65 dBm.

7. A system according to any claim 1, wherein said means for transmitting said first and second signals transmit said first and second signals at different times.

8. A system according to claim 1, which is a wireless local area network.

9. A system according to claim 8, wherein said means for transmitting said first signal is an access point.

10. A system according to claim 8, wherein said means for transmitting said second signal is an access point.

11. A system according to claim 8, wherein said means (4) for receiving said first signal is a mobile unit.

12. A system according to claim 8, wherein said means (4) for receiving said second signal is a mobile unit.

13. A system according to claim 8, wherein said means for transmitting said first signal is a mobile unit.

14. A system according to claim 8, wherein said means (4) for transmitting said second signal is a mobile unit.

15. A system according to claim 8, wherein said means for receiving said first signal is an access point.

16. A system according to claim 8, wherein said means for receiving said second signal is an access point.

17. A system for locating a mobile unit including:
- a first transmitter for transmitting a first signal at a relatively high power, from an access point;
- a second transmitter for transmitting a second signal at a predetermined, relatively low power, from said access point;
- a first receiver for receiving said first signal, at a mobile unit;
- a first detector for determining a first signal strength of said first signal at said first receiver;
- a first controller for determining whether said first signal strength exceeds a relatively low threshold level so as to determine whether service may be provided;
- a second receiver for receiving said second signal, at said mobile unit;
- a second detector for determining a second signal strength of said second signal at said second receiver;
- a second controller for determining whether said second signal strength exceeds a relatively high threshold level so as to locate the mobile unit within a known distance of said means for transmitting said second signal.

18. An access point configured for use in the system according to claim 1.

* * * * *